(12) United States Patent
Tsutsumi et al.

(10) Patent No.: US 7,396,797 B2
(45) Date of Patent: Jul. 8, 2008

(54) PRODUCTION METHOD OF CATALYST FOR FUEL CELL AND OF FUEL CELL, AND CATALYST FOR FUEL CELL AND FUEL CELL

(75) Inventors: Masami Tsutsumi, Kawasaki (JP); Seiji Hibino, Kawasaki (JP); Hiroaki Yoshida, Kawasaki (JP); Fumio Takei, Kawasaki (JP); Youichi Takasu, Kawasaki (JP); Kensuke Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 220 days.

(21) Appl. No.: 11/105,591

(22) Filed: Apr. 14, 2005

(65) Prior Publication Data

US 2006/0135357 A1    Jun. 22, 2006

(30) Foreign Application Priority Data

Dec. 17, 2004    (JP)    ............................ 2004-366193

(51) Int. Cl.
- *H01M 4/00* (2006.01)
- *H01M 4/88* (2006.01)
- *B01J 21/18* (2006.01)
- *B01J 23/74* (2006.01)
- *B01J 27/06* (2006.01)

(52) U.S. Cl. ........................ 502/185; 502/101; 502/181; 429/40; 429/41; 429/42; 429/43; 429/44

(58) Field of Classification Search ................. 502/185, 502/102, 161, 181, 182, 101; 429/40–44
See application file for complete search history.

(56) References Cited

U.S. PATENT DOCUMENTS

| | | | | |
|---|---|---|---|---|
| 2,930,767 | A | * | 3/1960 | Novak ......................... 502/100 |
| 5,030,608 | A | * | 7/1991 | Schubert et al. ............. 502/300 |
| 6,254,662 | B1 | * | 7/2001 | Murray et al. ................. 75/348 |
| 6,262,129 | B1 | | 7/2001 | Murray et al. |
| 6,284,402 | B1 | * | 9/2001 | Mallouk et al. ............... 429/40 |

(Continued)

OTHER PUBLICATIONS

Patent Abstracts of Japan, Publication No. 08-203536, published on Aug. 9, 1996.

(Continued)

*Primary Examiner*—Jerry A. Lorengo
*Assistant Examiner*—Patricia L Hailey
(74) *Attorney, Agent, or Firm*—Westerman, Hattori, Daniels & Adrian, LLP.

(57) ABSTRACT

A method for producing a catalyst for a fuel cell is provided which is capable of improving output characteristics of the fuel cell. Metal fine particles making up the catalyst for the fuel cell to be used as a fuel electrode and air electrode are formed by reducing platinum salt with molybdenum carbonyl. The catalyst for the fuel cell is formed by supporting platinum-molybdenum fine particles on carbon particles. By employing this reducing method, platinum-molybdenum fine particles being small in size and high in dispersibility can be obtained, making the catalyst for the fuel cell highly active. By constructing the fuel and air electrodes using the catalyst for the fuel cell, high outputs from the fuel cell are made possible.

25 Claims, 6 Drawing Sheets

U.S. PATENT DOCUMENTS

| | | | |
|---|---|---|---|
| 6,551,960 B1 * | 4/2003 | Laine et al. | 502/327 |
| 6,676,729 B2 * | 1/2004 | Sun | 75/348 |
| 6,814,777 B2 * | 11/2004 | Biberbach | 75/255 |
| 7,053,021 B1 * | 5/2006 | Zhong et al. | 502/185 |
| 7,074,380 B2 * | 7/2006 | Iwaki et al. | 423/447.3 |
| 2005/0235776 A1 * | 10/2005 | He et al. | 75/255 |
| 2006/0199886 A1 * | 9/2006 | Ryang | 524/262 |

OTHER PUBLICATIONS

Patent Abstracts of Japan, Publication No. 2000-054012, published on Feb. 22, 2000.

Patent Abstracts of Japan, Publication No. 2003-226901, published on Aug. 15, 2003.

* cited by examiner

20

PRODUCTION METHOD OF CATALYST FOR FUEL CELL AND OF FUEL CELL, AND CATALYST FOR FUEL CELL AND FUEL CELL

CROSS-REFERENCE TO RELATED APPLICATIONS

This application is based upon and claims the benefits priority from the prior Japanese Patent Application No. 2004-366193, filed on Dec. 17, 2004, the entire contents which are incorporated herein by reference.

BACKGROUND OF THE INVENTION

1. Field of the Invention

The present invention relates to a method for producing a catalyst to be used for a fuel cell, a method for producing the fuel cell, and to a catalyst to be used in the fuel cell and the fuel cell, and particularly to the method for producing the catalyst to be used for the fuel cell using platinum or the like, the method for producing the fuel cell using, as an electrode, such a catalyst produced as above, and to the catalyst to be used in the fuel cell and the fuel cell to be produced by using such methods as described above.

2. Description of the Related Art

Conventionally, a lithium secondary cell is widely used as a driving power source for miniaturized and compact devices such as notebook personal computers, portable phones, or the like. However, in recent years, such devices are further made high-performance, the lithium secondary cells becoming unable to fully satisfy demands for highly functional operations as a driving power source. At present, in addition to efforts to improve the lithium secondary cells, attempts to use a fuel cell as a driving power source as a substitute for the lithium secondary cell are being made.

Such a fuel cell includes, for example, a polymer electrolyte fuel cell (PEFC). The PEFC is a fuel cell which uses a solid polymer membrane having ionic conductivity as an electrolyte layer interposed between one electrode (fuel electrode) to which fuel such as hydrogen or the like is supplied and another electrode (air electrode) to which gas containing oxygen such as air is supplied. The fuel electrode or air electrode is formed by using a catalyst obtained by supporting metal fine particles of platinum(Pt) or the like on a supporter made up of, for example, porous carbon particles or the like. In the fuel electrode (negative electrode), by catalyst reaction of the supplied fuel on the electrode, mainly, protons and electrons are produced, or carbon dioxide is produced depending on a kind of fuel to be supplied. The protons move toward the air electrode (positive electrode) in the polyer membrane, and electrons are taken out to an outside of the fuel cell and, after having been fed to loads in the device, again flow toward the air electrode. In the air electrode, by catalyst reaction of the electrons and the protons having moved in the polymer membrane with oxygen having been fed to the air electrode on the electrode, mainly water is produced.

Thus, the PEFC can be used, by feeding fuel and oxygen thereto, as a driving power source, as in the case of the lithium secondary cell. Various studies on a direct methanol fuel cell (DMFC), out of the PEFCs, in particular, that uses methanol, as fuel, on which reforming has not been performed, as it is, are being made so as to put the DMFC to actual use, since the DMFC has simpler system configurations that are advantageous when being made small in size and lightweight.

In order to realize a fuel cell not only being small in size and lightweight but also being high-performance, by using a highly active catalyst as a fuel electrode or an air electrode serving as a reaction field for power generation, output characteristics of the fuel cell have to be improved. To achieve this, it is desirous that metal fine particles of platinum or the like contained in a catalyst are made small in size, its specific surface area is made large, and such metal fine particules are supported on a supporter in a highly-dispersed state.

Various methods for forming metal fine particles have been so far proposed not only in the field of fuel cells but also in other fields. For example, a method for forming metal fine particles by reducing metal salt with alcohol is proposed (see Japanese Unexamined Patent Publication No. 2000-54012).

Morevoer, when a catalyst to be used as an electrode of a fuel cell is formed, if metal fine particles are formed only by platinum, its active site is easily poisoned by carbon monoxide contained in fuel or air to be supplied or produced during catalyst reaction in some cases, which causes a life of the fuel cell to tend to be shortened. Therefore, at present, by combining platinum with other metal, for example, by alloying platinum with other metal, poisoning caused by carbon monoxide in the active site is suppressed to lengthen a life of a fuel cell. For example, a method is widely known which prevents poisoning caused by carbon monoxide or the like by using a catalyst formed by supporting a platinum-ruthenium (Ru) fine particle obtained by combining platinum and ruthenium.

As the method for suppressing poisoning caused by carbon monoxide, another method is also proposed which combines platinum with nickel(Ni) (see Japanese Unexamined Patent Publication No. Hei 8-203536). According to this proposed method, by physically mixing a catalyst obtained by supporting nickel fine particles on carbon particles and with a catalyst obtained by supporting platinum fine particles on carbon particles, an attempt to lengthen a life of the fuel cell is being made. Also, according to the above proposed method, after having formed a catalyst obtained by supporting nickel fine particles on carbon particles, further by supporting platinum on the resulting catalyst obtained by supporting the nickel fine particles on the carbon particles, an attempt to make a life of the fuel cell longer is also being made.

However, when a catalyst is formed by using platinum and other metals to suppress poisoning caused by carbon monoxide, following problems occur.

For example, in the formation of the catalyst in which platinum-ruthenium fine particles are supported on carbon particles, first, a reducing agent such as alcohol is added to a solution containing carbon particles and platinum salt to make platinum salt be reduced and then a liquid component is removed to precipitate platinum on carbon particles. Then, a solution containing carbon particles on which platinum has been precipitated and ruthenium salt is prepared and the ruthenium salt is reduced again by using the reducing agent such as alcohol or the like and liquid components are removed to make ruthenium be precipitated.

Thus, when the catalyst obtained by supporting metal fine particles containing platinum and other metal on carbon particles is formed, two-step reducing reactions are required. However, this causes costs to be naturally increased when compared with the case in which the catalyst is formed by supporting only platinum on carbon particles. Moreover, if this method is employed, due to occurrence of the two-step reducing reactions, metal fine particles to be finally obtained become large in size, causing its specific area to tend to become smaller. As a result, when the catalyst formed by the methods as described above is used as an electrode of a fuel cell, there is a fear that it is difficult to obtain an output being usable as a driving power source for high-performance devices in a stable manner.

SUMMARY OF THE INVENTION

In view of the foregoing, it is an object of the present invention to provide a method for producing a catalyst for a fuel cell to achieve a fuel cell having an excellent output characteristic.

It is another object of the present invention to provide a method for manufacturing a fuel cell having an excellent output characteristic using such the catalyst for the fuel cell as described above.

It is still another object of the present invention to provide a catalyst for a fuel cell to achieve a fuel cell having an excellent output characteristic and a fuel cell using such a catalyst for the fuel cell as described above.

According to one aspect of the present invention, there is provided a method for producing a catalyst, in which metal fine particles are supported on a supporter, for a fuel cell to be used as an electrode for the fuel cell, including the process of forming the metal fine particles containing platinum and a metal being different from the platinum by reducing platinum salt with metal carbonyl of the metal being different from the platinum.

According to another aspect of the present invention, there is provided a method for producing a fuel cell using, as its electrode, a catalyst obtained by supporting metal fine particles on a supporter, including the process of forming a catalyst by supporting the metal fine particles containing platinum and a metal being different from the platinum and being obtained by reducing platinum salt with metal carbonyl of the metal being different from the platinum on supporter particles to be used as a supporter and constructing an electrode by forming a layer of the catalyst on at least one surface of an electrolyte layer.

According to still another aspect of the present invention, there is provided a catalyst for a fuel cell obtained by supporting metal fine particles on a supporter to be used as an electrode for the fuel cell, including metal fine particles obtained by reducing platinum salt with metal carbonyl of a metal being different from the platinum and containing the platinum and the metal and supporter particles to be used as a supporter.

According to still another aspect of the present invention, there is provided a fuel cell using, as an electrode, a catalyst in which metal fine particles are supported on a supporter, wherein the catalyst formed by reducing platinum salt with metal carbonyl of a metal being different from the platinum and obtained by supporting metal fine particles containing the platinum and the metal on supporter particles to be used as a supporter is used as the electrode.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
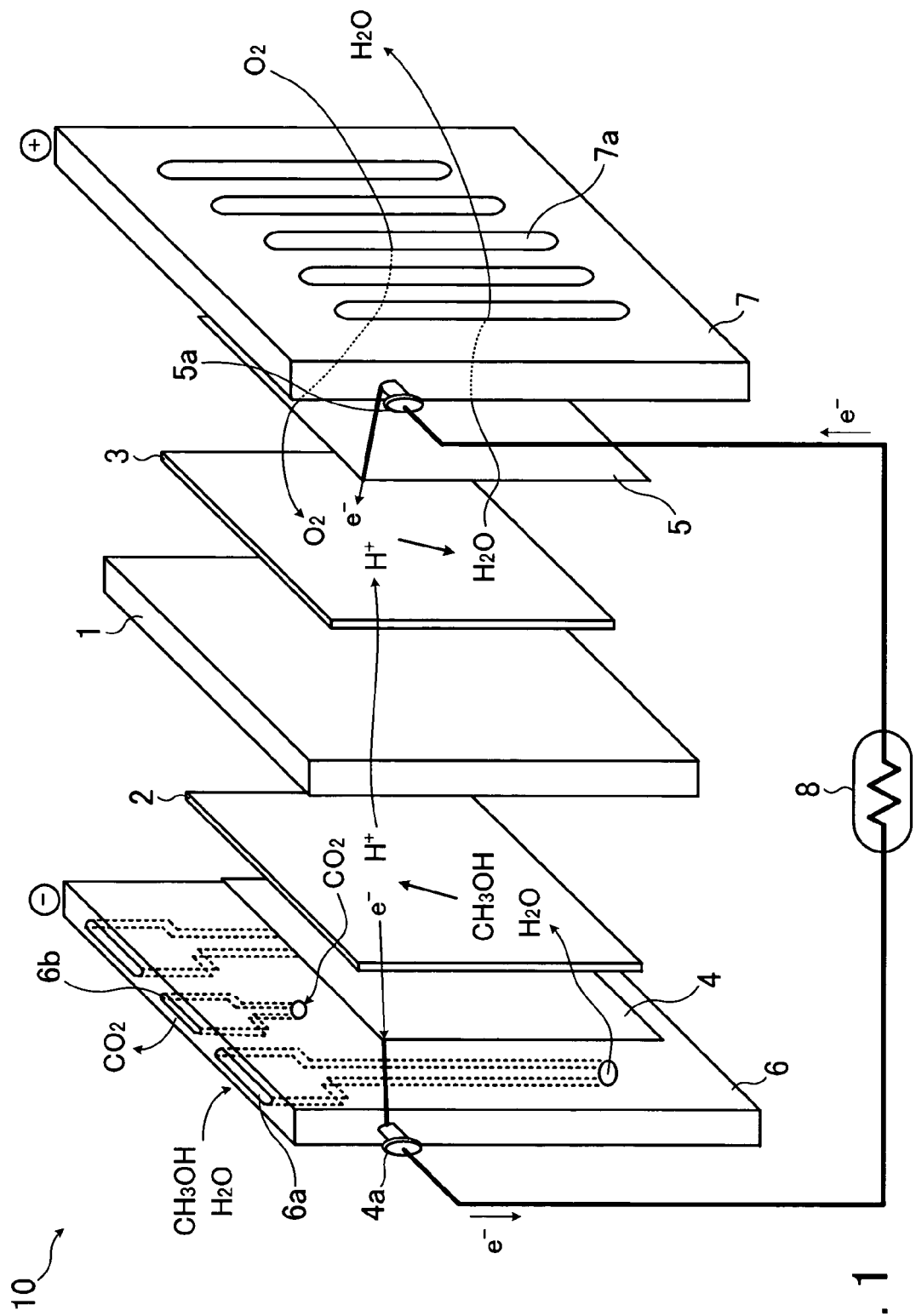
FIG. 1 shows operational principles and configurations of a fuel cell.

Preferred embodiments of the present invention will be described below with reference to the accompanying drawings, wherein like reference numerals refer to like elements throughout.

FIG. 1 shows operational principles and configurations of a fuel cell. The fuel cell 10 shown in FIG. 1 uses, as a solid electrolyte layer 1, for example, a fluororesin ion-exchange membrane such as a perfluoroalkyl sulfonic acid polymer membrane or the like having proton conductivity. As shown in FIG. 1, the solid electrolyte layer 1 is interposed between a fuel electrode 2 and an air electrode 3. Outside of the fuel electrode 2 are provided a current collector 4 and a flow path plate 6. Outside of the air electrode 3 are provided a current collector 5 and a flow path plate 7. Each of both the fuel electrode 2 and air electrode 3 is formed by using a catalyst obtained by supporting metal fine particles containing platinum and metal being different from another metal on a supporter such as a porous carbon particle or the like. The metal being different from another metal includes, for example, molybdenum (Mo), cobalt (Co), Iron (Fe), rhodium (Rh), and ruthenium (Ru). Each of both the current collectors 4 and 5 is made up of, for example, porous carbon paper. Each of both the flow path plates 6 and 7 is made, for example, of carbon. A current collector lead $4a$ connected to the current collector 4 is drawn from the flow path plate 6. A current collector lead $5a$ connected to the current collector 5 is drawn from the flow path plate 7.

The fuel cell 10 having such configurations is packed by outer packaging materials (not shown) provided on a side of the fuel electrode 2 including a side of a fuel tank and on a side of the air electrode 3 with outer packaging materials (not shown). To the fuel cell 10 is directly supplied an aqueous solution of methanol ($CH_3OH$) as fuel from a flow path $6a$ formed on the flow path plate 6. A reaction occurs between methanol and water ($H_2O$) contained in the fuel supplied into the fuel cell 10 on the fuel electrode 2 and, as a result, carbon dioxide ($CO_2$), proton ($H^+$), and electron ($e^-$) are produced. The carbon dioxide produced here is let out through the flow path $6b$ formed in the flow path plate 6 from the fuel cell 10 and the proton moves to the air electrode 3 in the solid electrolyte layer 1. Produced electrons pass from the current collector 4 through the current collector lead $4a$ and are taken out of the fuel cell 10 and, after having been fed to the loads 8 in outside circuits, pass through the current collector lead $5a$ and flow to the current collector 5 on a side of the air electrode 3. Oxygen ($O_2$) is fed to the air electrode 3 through the flow path $7a$ formed on the flow path plate 7 and the oxygen reacts with protons having moved into the solid electrolyte layer 1 on the air electrode 3 by using electrons flowing through the current collector 5 and, as a result, water is produced. The water produced here is let out from the flow path $7a$. By such reactions as described above, power is generated in the fuel cell 10.

Next, a method for forming the fuel cell 10 having such configurations as above is described below.

Figure 2:
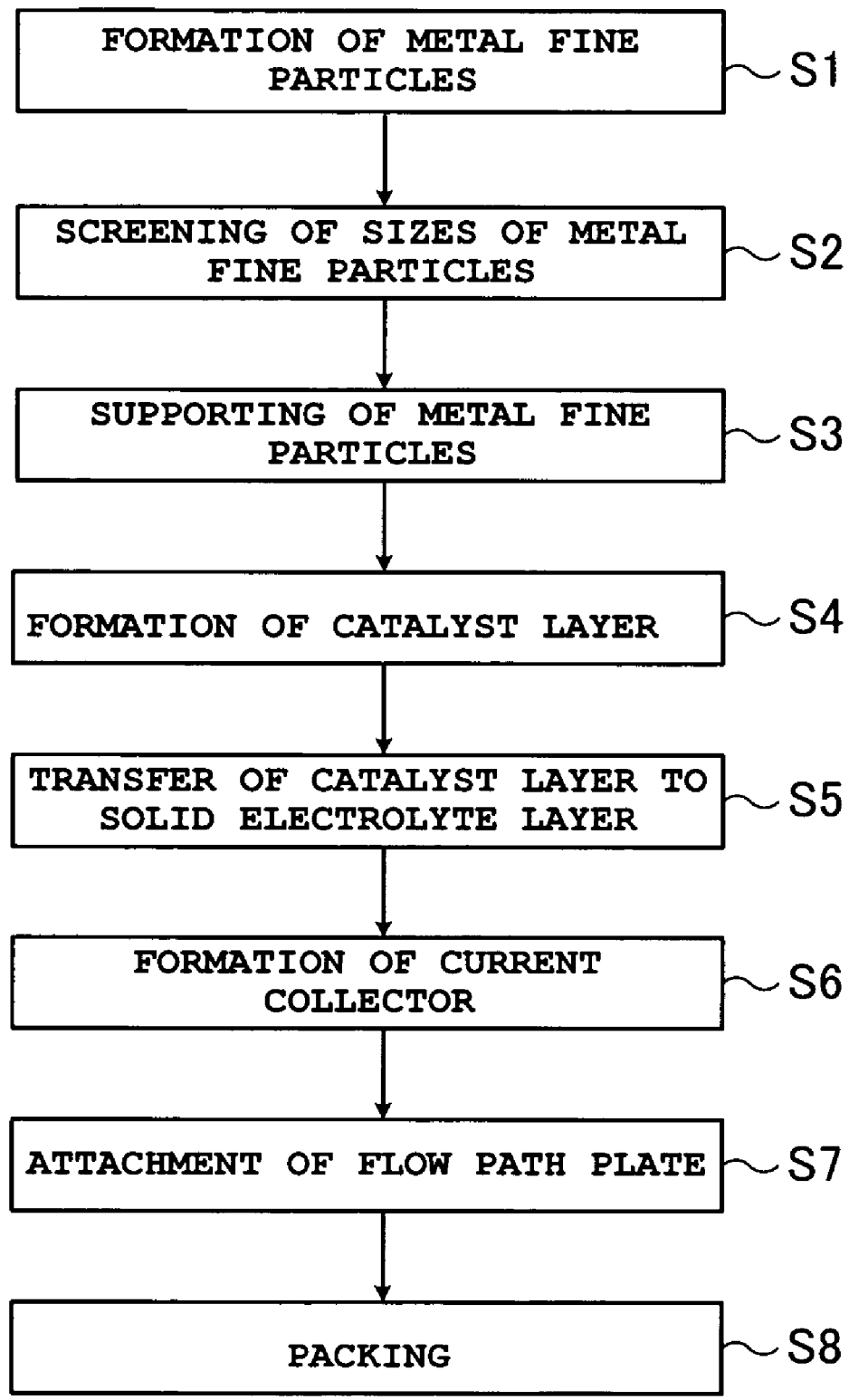
FIG. 2 shows schematically one example of a method for forming a fuel cell.

FIG. 2 shows schematically one example of a method for forming a fuel cell.

First, a catalyst to be used as an electrode for the fuel cell 10 is formed. In the first process of forming the catalyst, platinum salt is reduced with metal carbonyl in which carbon monoxide coordinates to another metal to produce metal fine particles containing platinum and another metal (Step S1). As the platinum salt, for example, platinum acetylacetonate (Pt (acac)$_2$) can be used. Moreover, as the metal carbonyl, for example, molybdenum carbonyl, cobalt carbonyl, iron carbonyl, rhodium carbonyl, and ruthenium carbonyl described above can be used. By using at least one kind of metal carbonyl, platium salt such as platinum acetylacetonate or the like is reduced.

The reducing reaction is made to occur by using a suitable solvent or a dispersing agent in a phase of liquid containing platinum metal and metal carbonyl. The platinum salt is reduced with carbon monoxide that coordinates to metal of metal carbonyl to become platinum and, at the same time, metal to which carbon monoxide coordinates and metal fine particles containing platinum are produced. Also, at time of the reducing reaction, a liquid temperature (reducing temperature) is properly controlled and the reducing reaction is made to occur in an atmosphere of an inert gas such as argon (Ar) or the like so as to prevent the produced metal particles from ignition.

Next, sizes of metal fine particles produced as above are screened (Step S2). The sizes can be screened by using, for example, a centrifugal separator. By centrifugation of the solution containing the metal fine particles obtained after the reducing reaction under proper conditions (in terms of the number of revolutions and/or time of centrifugation), the solution is separated into two layers, one being an upper layer and another being a lower layer, each containing metal fine particles having a specific particle size distribution. Furthermore, by taking out one layer containing metal fine particles of required size, out of the above two layers, and by again centrifugalizing contents of the layer under proper conditions, the contents are again separated into the upper and lower layers and each of the upper and lower layers can have a more narrow particle size distribution. By repeating such separation operations as above required times of operations, the sizes of the metal fine particles can be screened.

Next, metal fine particles having undergone the screening of the size are supported on a supporter (Step S3). To support the metal fine particles, the liquid in which metal fine particles obtained in Steps S1 and S2 are dispersed is put into the liquid in which porous carbon particles such as carbon black or the like to be used as a supporter are dispersed and, after ultrasonic waves are applied for a specified period of time to the liquid, the liquid is filtered and dried. Thus, a catalyst in which metal fine particles are supported on carbon particles is formed. Amounts of metal fine particles supported in the catalyst are calibrated mainluy by a charge of carbon particles to be used in the supporting process and a charge of metal fine particles to be used in the supporting process.

Next, by using the catalyst produced as above, an electrode of a fuel cell is formed. First, the produced catalyst, together with a proton conductive polyer, is dispersed in a suitable solvent and is made paste-like and then the paste-like solvent is coated on a substrate such as a polytetrafluoro ethylene sheet or the like and is dried so that a catalyst layer is formed (Step S4). As the proton conductive polymer, for example, a perfluoroalkyl sulfonic acid polyer can be used. The proton conductive polymer plays a role as not only conductor of the proton but also as a bonding agent among catalyst particles.

The catalyst layer, after having been formed, is transferred on surfaces of the solid electrolyte layer 1 of the perfluoroalkyl sulfonic acid polyer membrane by using a hot press (Step S5). This enables an MEA (Membrane Electrode Assembly) structure to be formed in which an electrode serving as the fuel electrode 2 and an electrode serving as the air electrode 3 are attached to the solid electrolyte layer 1. Moreover, in the above MEA structure, use of the catalysts formed in Steps S1 to S4 being attached to both surfaces of the solid electrolyte layer 1 is not necessarily required. For example, the catalyst formed by the conventional method may be used for the fuel electrode 2 and the catalyst formed in Steps S1 to S4 may be used only for the air electrode 3.

After the formation of the MEA structure in which electrodes are formed on both the surfaces of the solid electrolyte layer 1, porous carbon paper is attached to both the surfaces of the solid electrolyte layer 1 by using a hot press or the like, and current collectors 4 and 5 are formed by using the porous carbon paper (Step S6). Finally, each of the flow path plates 6 and 7 is attached to an outer side of each of the current collectors 4 and 5 (Step S7) and the current collector leads 4a and 5a are drawn out and the entire components are packed by a specified outer packaging material (Step S8).

In the fuel cell 10 having been constructed as above, by feeding an aqueous solution of methanol to its fuel electrode 2 and oxygen to its air electrode 3 and by connecting the current collectors 4a and 5a to loads 8 in the outer circuit, power generation is started.

Moreover, in the formation methods shown as examples in Steps S1 to S8, the metal fine particles, after their sizes have been screened in Steps S2 and S3, are supported on the carbon particles. However, the metal fine particles may be supported on the carbon particle without the process of screening the sizes of metal fine particles. In this case, after the platinum salt is reduced with metal carbonyl to form metal fine particles according to the method in Step S1, the metal fine particles may be supported on carbon particles according to the method in Step S3.

Before reduction of platinum salt with metal carbonyl, by dispersing platinum salt and carbon particles in liquid and then by adding metal carbonyl to the liquid so that platinum salt is reduced to form metal particles, and by filtering and drying processes to remove liquid components, metal fine particles may be supported on carbon particles. By forming the catalyst according to the processes as above, the electrode of the fuel cell 10 can be formed more effectively.

In the method of forming the fuel cell 10 shown as examples in Steps S1 to S8, by using metal carbonyl of metal other than platinum, platinum salt is reduced to form metal fine particles containing platinum and metal other than platinum in carbon particles and then the catalyst is formed by using the metal fine particles. That is, since the formation itself of the metal fine particles containing platinum and metal other than platinum can be achieved by one-time reducing reaction, the formation of the catalyst can be realized at lower costs when compared with the conventional case in which metal fine particles are formed by two-step reducing reactions. Furthermore, by reducing platinum salt with metal carbonyl of metal other than platinum to form metal fine particles and by setting proper reducing conditions, the metal fine particles can be made smaller in size when compared with the case in which metal fine particles are formed by two-step reducing reactions.

Next, the above formation method is described in detail by referring to a concrete example. Description is made by referring to the example in which molybdenum is used as metal other than platinum and a catalyst in which platinum-mobybdenum fine particles are supported on carbon particles is formed, and a fuel cell is constructed using the catalyst.

First, the formation of the platinum-molybdenum fine particles is explained. In a glove box in which an argon atmosphere is maintained, about 1.97 g of platinum acetylacetonate being a metal precursor, about 3.9 g of 1,2-hexadecanediol being a dispersing agent, and about 20 ml of octylether being a solvent, together with a stirrer, were put into a flask. Furthermore, also in the same glove box, about 1.6 ml of oleic acid and about 1.7 ml of oleylamine both being the dispersing agent, about 2.54 g of molybdenum carbonyl $(Mo(CO)_6)$ being a reducing agent and a metal precursor were put into the same flask. Thereafter, an opening of the flask was blocked by a rubber septum and the flask was put out of the glove box. A charge of each of the platinum acetylacetonate and the molybdenum carbonyl was set so that a weight ratio of platinum to molybdenum became about 1.

Then, a balloon being filled with argon gas is prepared. An injector is connected to the balloon and a needle of the injector is inserted into the rubber septum used to block the opening of the flask. This causes an atmosphere in the flask to be cut off from outside air and the argon atmosphere to be maintained therein. While the solution in the flask was stirred by the stirrer, the flask was heated up to about 230° C. being a reducing temperature by using a mantle heater. After the temperature reaches about 230° C., the flask was left, as it was, for about 30 minutes. Then, the flask was put down from the mantle heater and cooled down to a room temperature. This caused the platinum acetylacetonate to be reduced with molybdenum carbonyl, resulting in the formation of the platinum-molybdenum fine particles in the solution in the flask.

Next, the size screening of the platinum-molybdenum particles is described. After the formation of the platinum-molybdenum fine particles, the solution (about 25 ml) in the flask was taken out and about 50 ml of ethanol was added to the solution. Then, the solution was stirred and centrifugalized at 3000 rmp for 15 minutes by a centrifugal separator HIMACCT-5DL manufactured by HITACHI Ltd. This caused the solution to be separated into two layers, one being an upper liquid layer and a lower precipitate layer. As a result, the upper liquid layer came to contain the platinum-molybdenum fine particles being comparatively small in size and the lower layer precipitate came to contain the platinum-molybdenum fine particles being comparatively large in size. By taking out the precipitate obtained after the centrifugal separation or the upper liquid layer, it was made possible to obtain the platinum-molybdenum fine particles having a specific particle size distribution. Then, the upper liquid layer obtained after the centrifugal separation was discarded and, in this stage, the platinum-molybdenum fine particles being comparatively small in size was removed. After having added about 0.1 ml of each of oleic acid and oleylamine, both being a dispersing agent, about 25 ml of hexane being a solvent, about 5 ml of ethanol being also a solvent, in this order, to the residual lower precipiate layer, sucking and jetting of the solution using a pasteur pipet are repeated to make the precipitate be dispersed.

After confirming that the precipitate was dispersed uniformly, centrifugal separation was made again at 3000 rmp for 15 minutes and the upper liquid layer was taken out and the lower precipitate layer was discarded and, in this stage, the platinum-molybdenum fine particles being comparatively large in size was removed. Then, to the upper liquid layer taken out was added about 30 ml of ethanol being a solvent and centrifugal separation was made at 3000 rmp for 15 minutes.

After the centrifugal separation, the upper liquid layer was again discarded and, in this stage, the platinum-molybdenum fine particles being comparatively small in size was removed. To the lower precipitate layer were added about 40 ml of hexane and about 6 ml of ethanol both being a solvent and the resulting precipitate was dispersed using a pasteur pipet. After confirming that the precipitate was dispersed uniformly, centrifugal separation was made again at 3000 rmp for 15 minutes and the upper liquid layer was taken out and the lower precipitate layer was discarded and, in this stage, the platinum-molybdenum fine particles being comparatively large in size was removed. Then, to the upper liquid layer taken out was added about 20 ml of ethanol being a solvent and centrifugal separation was made at 3000 rmp for 15minutes.

The resulting upper liquid layer obtained after the centrifugal separation was discarded and about 0.1 ml of each of oleic acid and oleylamine being a dispersing agent and about 25 ml of hexane and about 5 ml of ethanol both being a solvent were added, in this order, to the residual precipitate, and the resulting solution was dispersed using the pasteur pipet and preserved.

Figure 3:
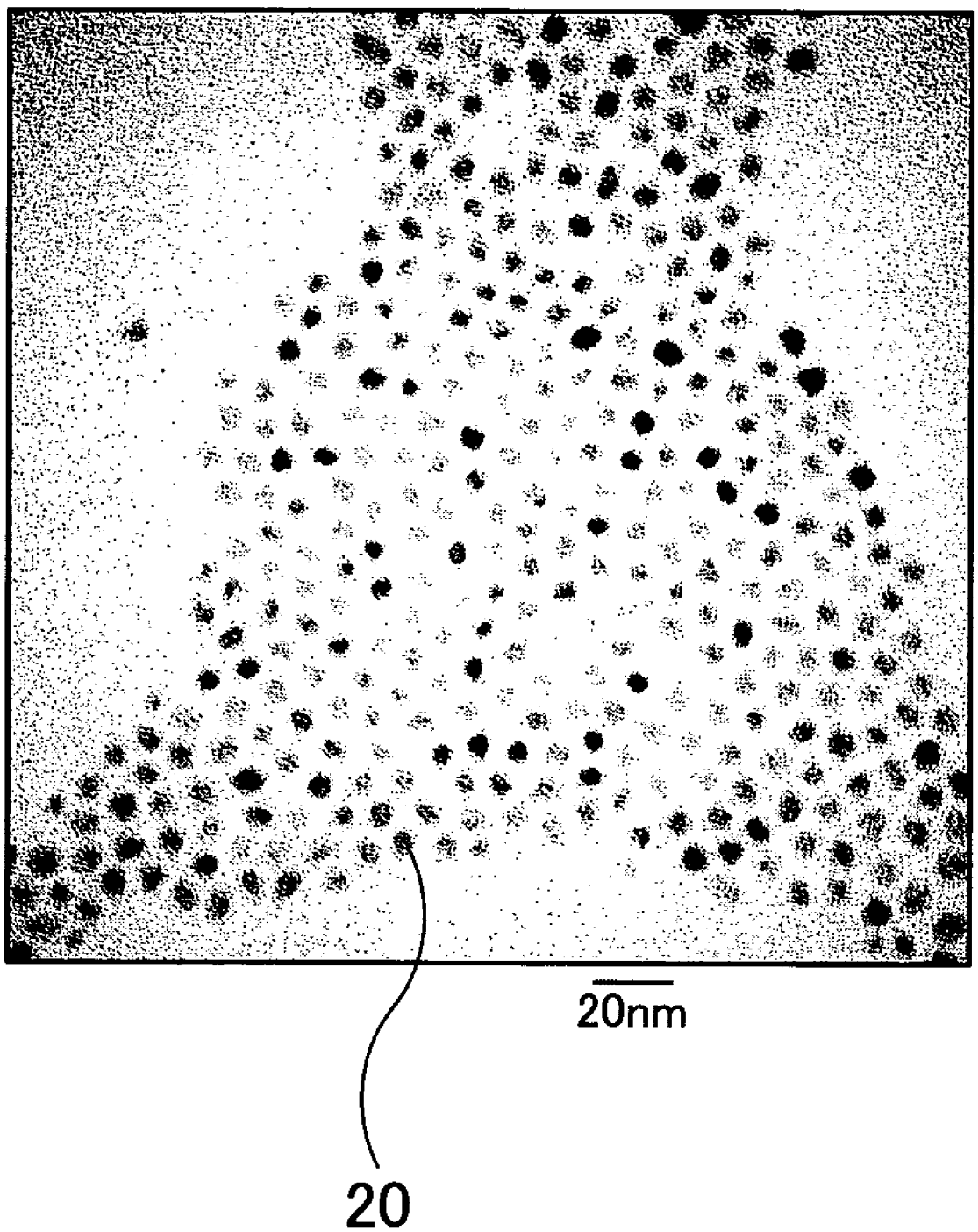
FIG. 3 shows a transmission electron microscopic photograph of a platinum-molybdenum fine particles obtained after a size screening process.

FIG. 3 shows a transmission electron microscopic photograph of a platinum-molybdenum fine particles obtained after a size screening process. As shown in FIG. 3, by performing the size screening process according to the above procedure, after the size screening process, a platinum-molybdenum fine particles 20 having uniform sizes of about 2 nm to 5 nm and having high dispersibility can be obtained.

Next, a process of supporting the platinum-molybdenum fine particles on a supporter is described. A solution obtained by mixing about 0.1 ml of each of oleic acid and oleylamine with about 25 ml of hexane and about 5 ml of ethanol was used as a dispersion medium and about 0.02 g of porous carbon particles (Ketjen Black EC600JD manufactured by LION Ltd.) serving as a supporter was added to the dispersion medium. A specific surface area, calculated based on a BET (Brunauer-Emmett-Teller)-method ($N_2$-BET method) using nitrogen ($N_2$) of the carbon particle, was about 1,270 $m^2/g$ and a primary particle diameter of the carbon particle particle was about 34 nm. An ultrasonic vibrator (Vibra-cell model VC130 manufactured by Sonic & Materials Ltd.) was put into the mixed solution containing the carbon particles and ultrasonic waves having an output of about 6 W to 7 W were applied for about 20 minutes to the solution to make the carbon particle be dispersed in the solution.

Then, a liquid in which the platinum-molybdenum fine particles having been preserved before was added to the liquid in which the carbon particles were dispersed. An amount of the added platinum-molybdenum fine particle dispersion liquid was set so that about 0.02 g of the platinum-molybdenum fine particles were contained. That is, the charge was set so that, when a catalyst obtained by supporting the platinum-molybdenum fine particles on the carbon particle was formed, the catalyst theoretically contained about 50% by weight (wt %) of the platinum-molybdenum fine particles. Then, the ultrasonic vibrator was put into a mixed liquid of the carbon particle dispersion liquid and the platinum-molybdenum dispersion liquid and ultrasonic waves having an output of 6 W to 7 W were applied for about 20 minutes. Next, the liquid was filtered by using a fluororesin filter having a pore side of about 0.1 μm to collect the carbon particles on which the platinum-molybdenum fine particles were supported. Then, the carbon particles were heated at about 180° C. for about ten minutes and dried in air to remove liquid components containing the solvent, dispersing agent or the like and the catalyst for a fuel cell in which platinum-molybdenum fine particles was supported on the carbon particle was obtained. A result from analysis shows that the catalyst obtained then contained about 42% by weight of the platinum-molybdenum.

Figure 4:
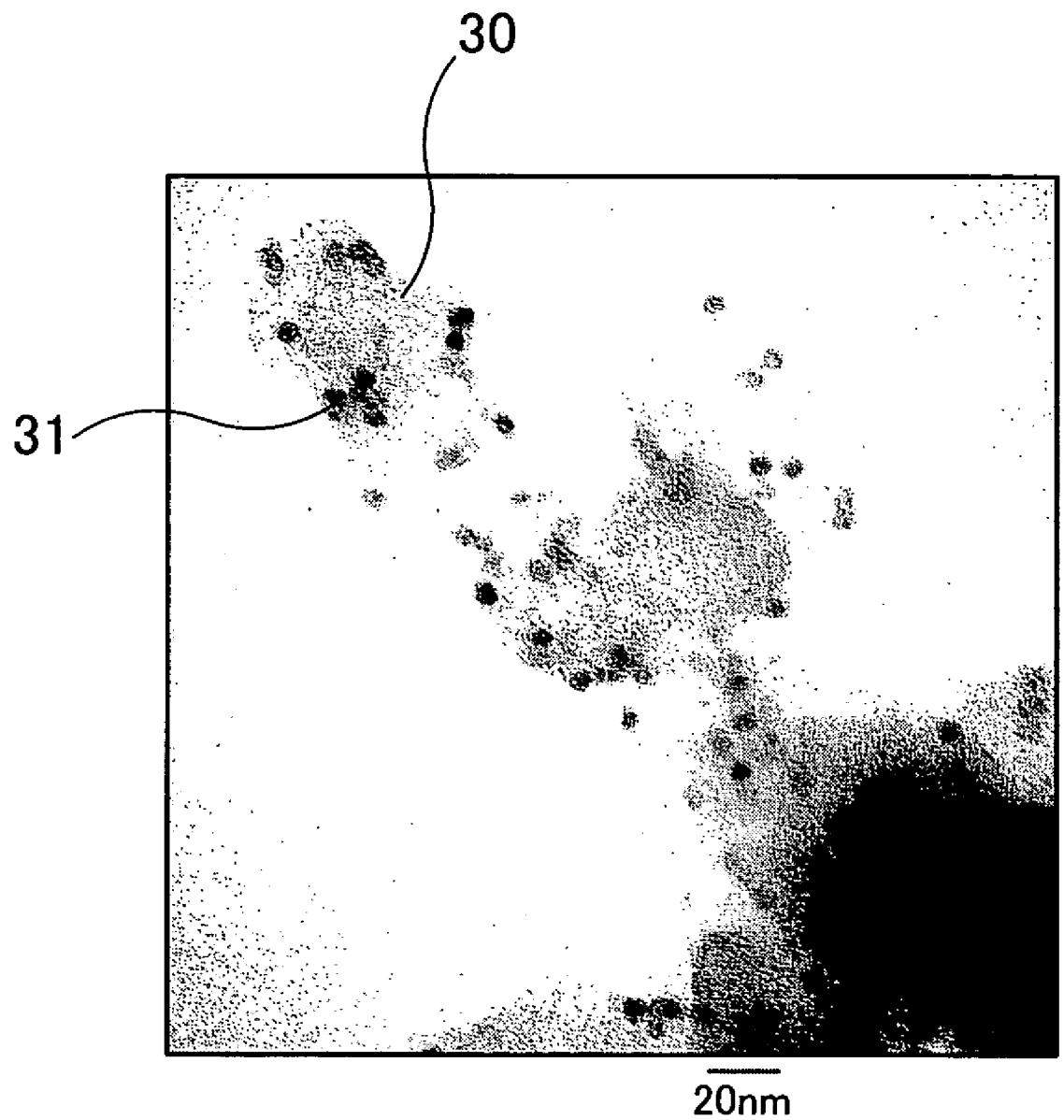
FIG. 4 shows a transmission electron microscopic photograph of the catalyst obtained by supporting platinum-molybdenum fine particles on carbon particles.

FIG. 4 shows a transmission electron microscopic photograph of the catalyst in which the platinum-molybdenum fine particles are supported on the carbon particles. Moreover, the catalyst shown in FIG. 4 contains about 42% by weight of the platinum-molybdenum. As shown in FIG. 4, in the catalyst, the platinum-molybdenum fine particles being uniform in size were supported on the carbon particles 30. Though not described above, the catalyst for a fuel cell obtained after having been heated and dried may be treated thermally in an atmosphere of hydrogen.

Next, the formation of electrodes for the fuel cell is described. First, the formation of the air electrode is explained. In the embodiment, the air electrode was formed by using the catalyst obtained by supporting the platinum-molybdenum fine particles on the carbon particles. First, the catalyst is dispersed, together with a perfluoroalkyl sulfonic acid polymer, in a water-alcohol mixed solvent and a catalyst paste is formed by defoaming the solvent. The catalyst paste formed as above is coated on a polytetrafluoro ethylene sheet and is dried to make a catalyst layer be formed. After the formation of the catalyst layer, the catalyst layer was transferred by using a hot press to one side of the perfluoroalkyl sulfonic acid polymer membrane to be used as a solid electrolyte layer.

Next, the formation of a fuel electrode is described. Here, as the fuel electrode, the catalyst obtained by supporting the platinum-ruthenium fine particles on the carbon particles by the conventional two-step reducing reaction was used. In this catalyst, carbon particles of same the kind (Ketjen black EC manufactured by LION Ltd., specific surface area calculated based on the BET method being about 800 $m^2/g$, primary particle diameter being about 40 nm) as used for supporting the platinum-molybdenum fine particles were employed. The catalyst contained about 53% by weight of the platinum-ruthenium (about 30% by weight of platinum and about 23% by weight of ruthenium). Moreover, the specific surface area, calculated by a CO (carbon oxide) adsorption method, of the platinum-ruthenium fine particle, was about 103 $m^2/g$ and the specific surface area, calculated based on $N_2$-BET method, of the entire catalyst containing the carbon particles was 338 $m^2/g$. As in the case of the formation of the air electrode, the catalyst formed as above, together with the perfluoroalkyl sulfonic acid polymer, was dispersed in the water-alcohol mixed solvent. After having defoamed the solvent to form a catalyst paste, a catalyst layer was formed in a polytetrafluoro ethylene sheet by using the catalyst paste. Then, the catalyst layer obtained by supporting the platinum-molybdenum fine particles on carbon particles was transferred, by using the hot press, to another surface of the perfluoroalkyl sulfonic acid polymer membrane, to the one surface of which the catalyst layer obtained by supporting the platinum-molybdenum fine particles on the carbon particles was transferred. Thus, an MEA structure was obtained in which the air electrode consisting of the platinum-molybdenum fine particles was attached to one surface of the solid electrolyte layer and the fuel electrode consisting of the platinum-ruthenium fine particles was attached to another surface of the solid electrolyte layer.

Next, attachment of current collectors, flow path plates, and outer packaging materials are explained. After the formation of the MEA structure, porous carbon paper serving as current collectors was attached to each of the air electrode and fuel electrode by using the hot press and flow path plates each having a specified flow path were connected to each of the air electrode and the fuel electrode. By configuring as above, a basic structure of the fuel cell is formed in which the MEA structure is put between the current collectors and flow path plates are connected to outer sides of the current collectors. Then, after drawing current collector leads from the flow path plates, the basic structure of the fuel cell was packed by outer packaging materials provided on a side of the fuel electrode including a side of a fuel tank and on a side of the air electrode. By supplying an aqueous solution of methanol being fuel to the fuel electrode in the fuel cell formed as above and gas containing oxygen, for example, air to the air electrode and by connecting the current collector leads to the outside circuits, power generation was started.

Figure 5:
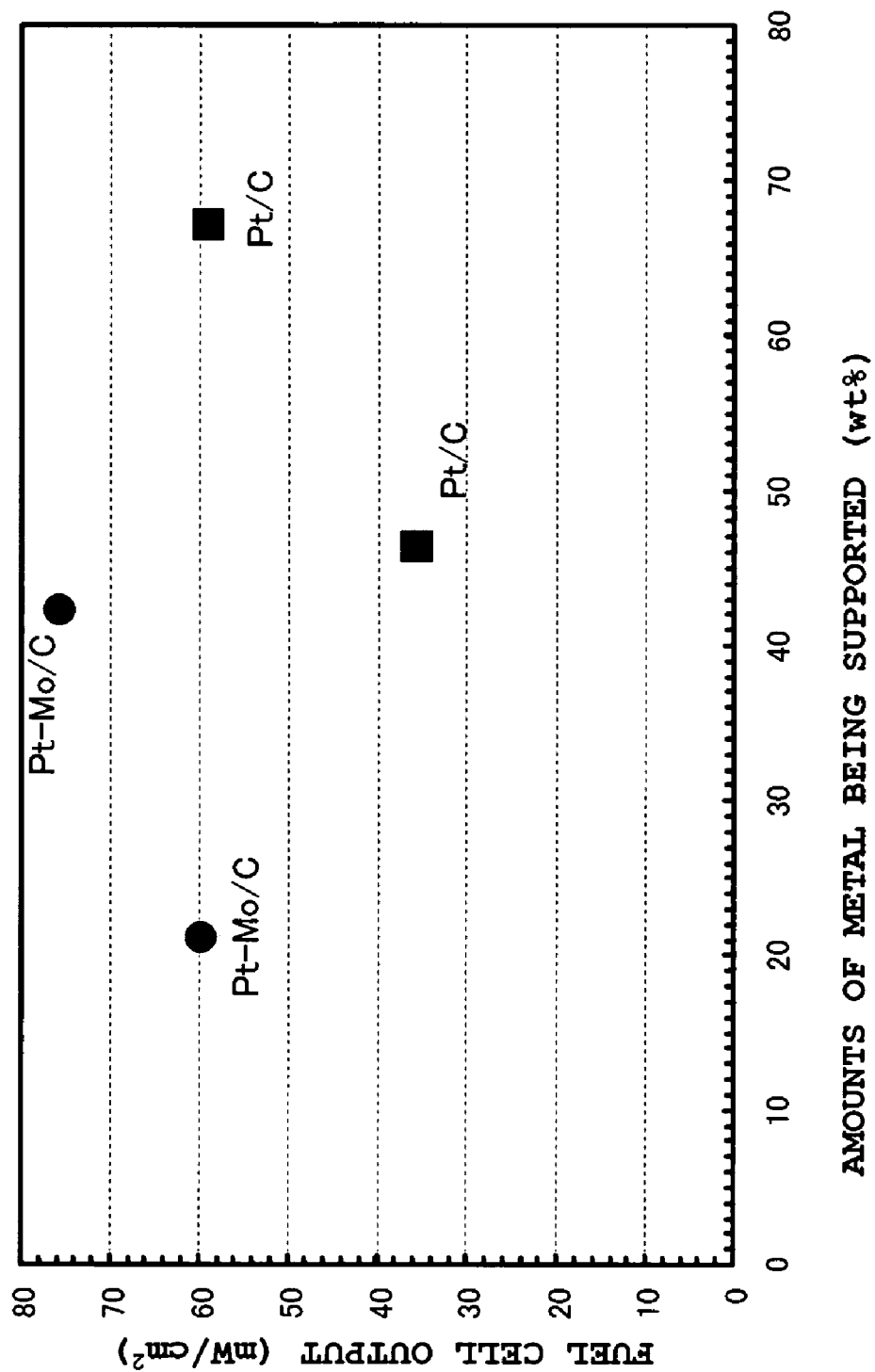
FIG. 5 shows a relation between an amount of metal supported by a supporter in a catalyst and an output of a fuel cell.

Output characteristics of a fuel cell constructed by using a catalyst obtained by supporting platinum-molybdenum fine particles on carbon particles are described. FIG. 5 shows a relation between an amount of metal supported in the catalyst and an output from a fuel cell. In FIG. 5, an amount of metal (wt %) supported in the catalyst used as the air electrode of the fuel cell is plotted as abscissa and a fuel cell output (mW/cm²) as ordinate. FIG. 5 shows outputs from the fuel cell whose air electrode is constructed by using two kinds of catalysts (Pt—Mo/C) in which platinum-molybdenum fine particles are supported on carbon particles, one containing about 21% by weight of the platinum-molybdenum and another containing about 42% by weight of the platinum-molybdenum. In FIG. 5, the "Pt—Mo/C" represents that an alloy of platinum and molybdenum is supported on carbon. The catalyst containing 42% by weight of the platinum-molybdenum shown in FIG. 5 is the catalyst described in the embodiment. The catalyst containing about 42% by weight of the platinum-molybdenum supported on the supporter was formed according to conditions shown in the above forming method except that a charge of a precursor of each of the platinum and molybdenum was changed. FIG. 5 also shows, for comparison, outputs from the fuel cell whose air electrode is constructed by using two kinds of catalysts (Pt/C) obtained by supporting only platinum-molybdenum fine particles on carbon particles, one containing about 48% by weight of the platinum-molybdenum and another containing about 68% by weight of the platinum-molybdenum. In FIG. 5, the "Pt/C" represents that platinum is supported on carbon.

The carbon particle used in the catalyst shown in FIG. 5 uses the carbon particle of the same kind (Ketjen black EC manufactured by LION Ltd., specific surface area, calculated based on the BET method, being about 800 $m^2/g$, primary particle diameter being about 40 nm) as used in the catalyst obtained by supporting the platinum-molybdenum fine particles. In the catalyst containing about 48% by weight of platinum, the specific surface area, calculated by the CO adsorption method, of the platinum-ruthenium fine particle, was about 150 $m^2/g$ and the specific surface area, calculated based on $N_2$-BET method, of the entire catalyst was 383 $m^2/g$. Moreover, in the catalyst containing about 68% by weight of platinum, the specific surface area, calculated by the CO adsorption method, of the platinum-ruthenium fine particle, was about 84 $m^2/g$ and the specific surface area, calculated based on $N_2$-BET method, of the entire catalyst was 196 $m^2/g$. Moreover, the fuel electrode of the fuel cell used for the measurement of outputs is constructed by using a catalyst obtained by supporting 53% by weight of the platinum-ruthenium on carbon particles as shown in the above forming method, irrespective of an amount of metal being supported in the catalyst used for the air electrode constructed by using a catalyst in which platinum-molybdenum fine particles are supported on carbon particles or using a catalyst in which platinum fine particles are supported on carbon particles.

As shown in FIG. 5, in the case where the air electrode was constructed by using the catalyst obtained by supporting the platinum-molybdenum fine particles on carbon particles, the fuel cell output was about 60 mW/cm$^2$ when about 21% by weight of the platinum-molybdenum was supported and about 76 mW/cm$^2$ when about 42% by weight of the platinum-molybdenum was supported. On the other hand, as shown in FIG. 5, in the case where the air electrode was constructed by using the catalyst in which the platinum-molybdenum fine particles were supported on carbon particles, the fuel cell output was about 36 mW/cm$^2$ when about 48% by weight of the platinum-molybdenum was supported and about 59 mW/cm$^2$ when about 68% by weight of the platinum-molybdenum was supported. Thus, higher outputs from the fuel cell could be obtained by less amounts of metal supported on the carbon particles in the case where the air electrode was formed by using the catalyst obtained by supporting platinum-molybdenum on carbon particles compared with the case where the air electrode was formed by using the catalyst in which only platinum fine particles were supported on carbon particles.

Furthermore, the measurement result suggests that, in the catalyst obtained by supporting the platinum-molybdenum fine particles on carbon particles, when a fact was considered that an amount of platinum being supported in the catalyst was about a half of the amount of the platinum-molybdenum being supported, higher outputs from the fuel cell can be obtained by further less amounts of platinum supported on carbon particles when compared with the catalyst in which platinum fine particles were supported on carbon particles. Thus, by using the catalyst obtained by supporting platinum-molybdenum fine particles on carbon particles to form the air electrode of the fuel cell, higher outputs can be obtained by less amounts of metal being supported or by less amounts of platinum being supported. This suggests that, in the catalyst obtained by supporting platinum-molybdenum fine particles on carbon particles, platinum-molybdenum fine particles being small and uniform in size and having high dispersibility were supported on carbon particles.

Activity of each of the catalysts shown in FIG. 5 was also studied. The activity of each catalyst was evaluated by measuring a decomposing reaction speed (oxygen generating speed) of hydrogen peroxide (10% by volume).

Figure 6:
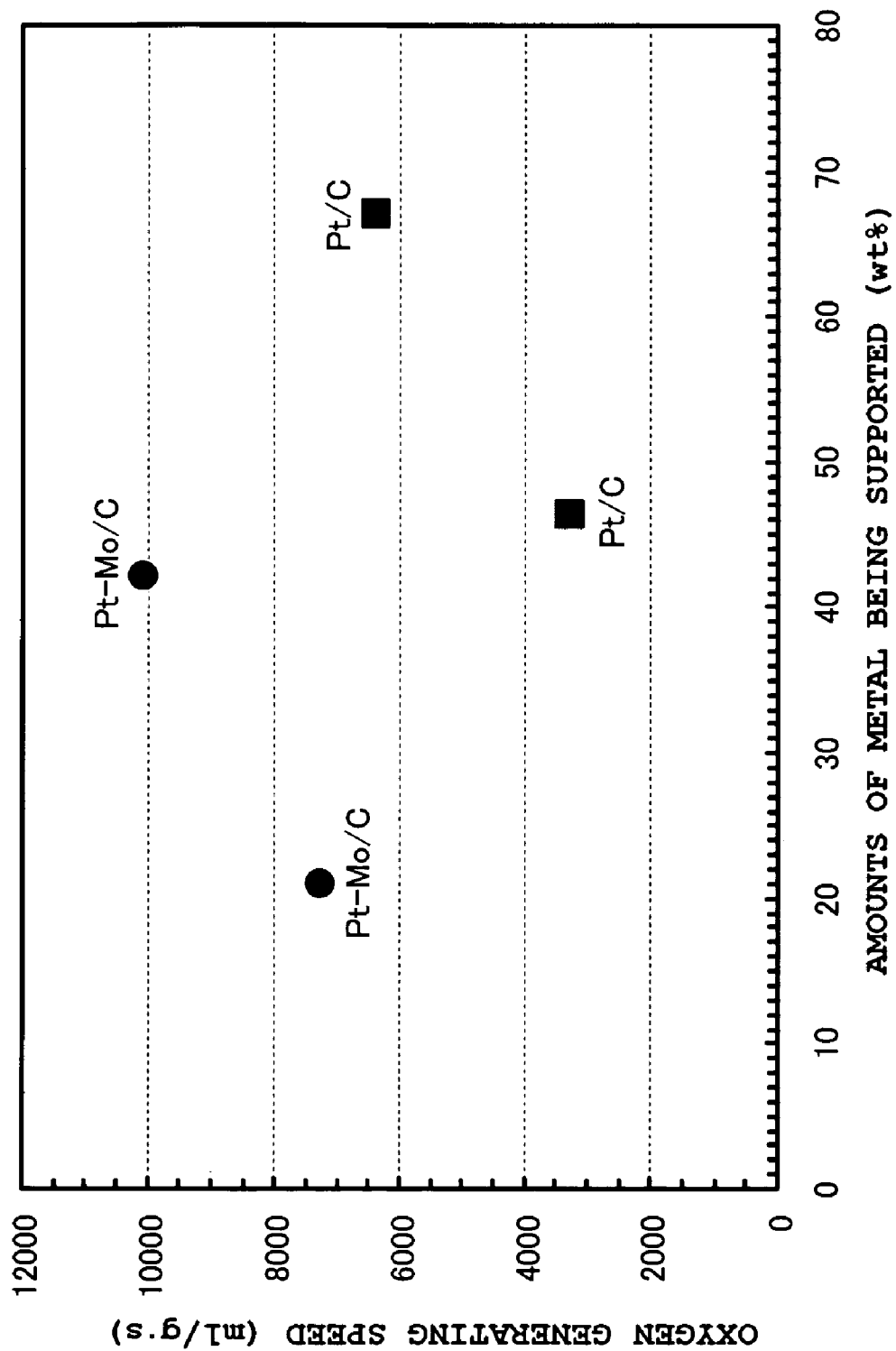
FIG. 6 shows a relation between an amount of metal supported in a catalyst and an oxygen generating speed.

FIG. 6 shows a relation between an amount of metal supported in a catalyst and an oxygen generating speed. In FIG. 6, an amount of metal (wt %) supported in the catalyst is plotted as abscissa and an oxygen generating speed (ml/g·s) as ordinate. As shown in FIG. 6, in the catalyst obtained by supporting platinum-molybdenum fine particles on carbon particles, the oxygen generating speed (ml/g·s) was about 7,263 ml/g·s when an amount of platinum-molybdenum supported was about 21% by weight and about 10,048 ml/g·s when an amount of platinum-molybdenum supported was about 2% by weight. On the other hand, in the catalyst obtained by supporting platinum-molybdenum fine particles on carbon particles, the oxygen generating speed (ml/g·s) was about 3,273 ml/g·s when an amount of platinum supported was about 48% by weight and about 6,380 ml/g·s when an amount of platinum supported was about 68% by weight. Thus, a higher oxygen generating speed was obtained by less amounts of metal supported in the catalyst in which platinum-molybdenum fine particles were supported on carbon particles when compared with the catalyst in which only platinum particles were supported on carbon particles and relations among the platinum-molybdenum fine particles supported on carbon particles and the platinum particles supported on carbon particles in terms of magnitude and amount were the same as shown in FIG. 5. Higher output from the fuel cell achieved by using the catalyst in which the platinum-molybdenum fine particles are supported on carbon particles is contributed to higher activity of the catalyst used as the air electrode.

As described above, by reducing platinum salt with molybdenum carbonyl, platinum-molybdenum fine particles being small in size and having excellent dispersibility can be formed. Also, by supporting the platinum-molybdenum fine particles on carbon particles, it is made possible to obtain the catalyst in which the platinum-molybdenum fine particles being highly active and small in size are supported in carbon particles. That is, by constructing the air electrode of the fuel cell by using such catalysts as described above, the fuel cell that can provide high outputs and can be used as a driving power source for high-performance devices can be manufactured.

Moreover, in the above embodiment, the catalyst obtained by supporting the platinum-molybdenum fine particles on carbon particles is used only for the air electrode. However, it is needless to say that the catalyst in which the platinum-molybdenum fine particles are supported on carbon particles can be used only for the air electrode or for both the air and fuel electrodes.

In the embodiment, the catalyst obtained by reducing platinum salt with molybdenum carbonyl is used for the air electrode or the fuel electrode. However, catalysts obtained by reducing platinum salt with cobalt carbonyl, iron carbonyl, rhodium carbonyl, ruthenium carbonyl, or the like may be employed. Moreover, a ternary catalyst obtained by reducing platinum salt using two or more kinds of carbonyl selected from molybdenum carbonyl, cobalt carbonyl, iron carbonyl, rhodium carbonyl, ruthenium carbonyl, or the like may be used. In these cases, by considering compositions of metal fine particles to be formed, a charge of metal carbonyl set at time of reducing reaction may be calibrated when necessary. No special changes in other conditions, for example, reducing temperatures, reducing time, or the like are required. Even by using such catalysts as above, the same characteristics as shown in FIGS. 5 and 6 can be obtained.

Moreover, after having formed metal fine particles containing platinum and metal other than platinum by the above method, by impregnating the metal fine particles with sulfuric acid, nitric acid, or the like, the metal other than platinum contained in the metal fine particles may be selectively removed. The catalyst obtained by using the metal fine particles by the method described above and performing size screening operations when necessary may be also employed for the air electrode or the fuel electrode. By using acid to selectively remove metal other than platinum contained in the metal fine particles, larger unevenness of a surface of the metal fine particle being left occurs, which results in a larger surface area, thus improving catalyst activity and output characteristics of the fuel cell.

In the present invention, the metal fine particles making up the fuel cell catalyst to be used as an electrode of the fuel cell are formed by reducing platinum with metal carbonyl other than metal being different from platinum. This enables formation of the fuel cell catalyst in which metal fine particles being small in size are supported on a supporter in a highly dispersed state. By using such fuel cell catalysts as an electrode of a fuel cell, the fuel cell having excellent output characteristics and being able to be used as a driving power source for high-performance devices can be achieved.

The foregoing is considered as illustrative only of the principles of the present invention. Further numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A catalyst for a fuel cell obtained by supporting metal fine particles on a supporter to be used as an electrode for said fuel cell, comprising:
   metal fine particles obtained by reducing platinum salt with metal carbonyl of a metal being different from said platinum and containing said platinum and said metal; and
   supporter particles to be used as a supporter,
   wherein said metal carbonyl includes two or more kinds of metal carbonyl selected from the group consisting of molybdenum carbonyl, cobalt carbonyl, iron carbonyl, rhodium carbonyl, and ruthenium carbonyl.

2. A fuel cell using, as an electrode, a catalyst in which metal fine particles are supported on a supporter, wherein said catalyst formed by reducing platinum salt with metal carbonyl of a metal being different from said platinum and obtained by supporting metal fine particles containing said platinum and said metal on supporter particles to be used as a supporter is used as said electrode,
   wherein said metal carbonyl includes two or more kinds of metal carbonyl selected from the group consisting of molybdenum carbonyl, cobalt carbonyl, iron carbonyl, rhodium carbonyl, and ruthenium carbonyl.

3. A method for producing a catalyst, in which metal fine particles are supported on a supporter, for a fuel cell to be used as an electrode for said fuel cell, comprising the process of:
   forming said metal fine particles containing platinum and a metal being different from said platinum by reducing platinum salt with metal carbonyl of said metal being different from said platinum,
   wherein said metal carbonyl includes two or more kinds of metal carbonyl selected from the group consisting of molybdenum carbonyl, cobalt carbonyl, iron carbonyl, rhodium carbonyl, and ruthenium carbonyl.

4. The method for producing the catalyst for the fuel cell according to claim 3, further comprising the process of:
   supporting the produced metal fine particles on supporter particles to be used as a supporter, after the process of the formation of said metal fine particles.

5. The method for producing the catalyst for the fuel cell according to claim 4, wherein, in the process of supporting said metal fine particles on said supporter particles, by dispersing said metal fine particles and said supporter particles into a liquid and by removing liquid components, said metal fine particles are supported on said supporter particles.

6. The method for producing the catalyst for the fuel cell according to claim 3, wherein, in the process of forming said metal fine particles, by reducing said platinum salt with said metal carbonyl in the presence of supporter particles to be used as a supporter in a liquid to form said metal fine particles and by removing liquid components, said metal fine particles are formed in a state in which said metal fine particles are supported on said supporter particles.

7. The method for producing the catalyst for the fuel cell according to claim 3, further comprising a process of screening sizes of the formed metal fine particles after the process of the formation of said metal fine particles.

8. The method for producing the catalyst for the fuel cell according to claim 7, wherein, in the process of screening sizes of said metal fine particles, by dispersing said metal fine particles in a liquid, centrifugalizing said liquid in which said metal fine particles have been dispersed and separating said metal fine particles into two portions, one being contained in an upper layer and another being contained in a lower layer, sizes of said metal fine particles are screened.

9. The method for producing the catalyst for the fuel cell according to claim 7, further comprising the process of:
   supporting said metal fine particles whose sizes have been screened on supporter particles to be used as a supporter, after the process of screening sizes of said metal fine particles.

10. The method for producing the catalyst for the fuel cell according to claim 9, wherein, in the process of supporting said metal fine particles on said supporter particles, by dispersing said metal fine particles and said supporter particles in a liquid and by removing liquid components, said metal fine particles are supported on said supporter particles.

11. The method for producing the catalyst for the fuel cell according to claim 3, further comprising the process of:
   removing selectively said metal contained in said metal fine particles, after the process of the formation of said metal fine particles and before a process of screening sizes of said metal fine particles.

12. The method for producing the catalyst for the fuel cell according to claim 11, wherein, in the process of removing selectively said metal, said metal contained in said metal fine particles is selectively removed by using acid.

13. The method for producing the catalyst for the fuel cell according to claim 11, further comprising the process of:
   supporting said metal fine particles from which said metal has been selectively removed on supporter particles to be used as a supporter, after the process of removing selectively said metal.

14. The method for producing the catalyst for the fuel cell according to claim 11, further comprising the process of:
   screening sizes of said metal fine particles from which said metal has been selectively removed, after the process of removing selectively said metal.

15. The method for producing the catalyst for the fuel cell according to claim 14, wherein, said metal fine particles whose sizes have been screened are supported on supporter particles to be used as a supporter, after the process of screening sizes of said metal fine particles.

16. The method for producing the catalyst for the fuel cell according to claim 3, wherein said platinum salt is platinum acetylacetonate.

17. The method for producing the catalyst for the fuel cell according to claim 3, wherein, in the process of the formation of said metal fine particles, by preparing a solution obtained by putting said platinum salt and said metal carbonyl, together with a dispersing agent, into a solvent and by heating said solution up to a reducing temperature while said solution is being stirred, said metal fine particles are formed.

18. The method for producing the catalyst for the fuel cell according to claim 17, wherein the formation of said solution and the heating of said solution are performed in an inert gas atmosphere.

19. A method for producing a fuel cell using, as its electrode, a catalyst obtained by supporting metal fine particles on a supporter, comprising the process of:
   forming a catalyst by supporting said metal fine particles containing platinum and a metal being different from said platinum and being obtained by reducing platinum salt with metal carbonyl of said metal being different from said platinum on supporter particles to be used as a supporter;

forming a layer of said catalyst on at least one surface of an electrolyte layer and constructing electrodes on both surfaces of the electrolyte layer;

providing outside of each of the electrodes with a current collector; and providing a means for supplying oxygen to one of the electrodes and a means for supplying fuel to another of the electrodes, wherein said metal carbonyl includes two or more kinds of metal carbonyl selected from the group consisting of molybdenum carbonyl, cobalt carbonyl, iron carbonyl, rhodium carbonyl, and ruthenium carbonyl.

20. The method for producing the fuel cell according to claim 19, wherein, in the process of forming said catalyst, by dispersing said metal fine particles obtained by reducing said platinum salt with said metal carbonyl and said supporter particles in a liquid and by removing liquid components, said catalyst in which said metal fine particles are supported on said supporter particles is formed.

21. The method for producing the fuel cell according to claim 19, wherein, in the process of forming said catalyst, by forming said metal fine particles obtained by reducing said platinum salt with said metal carbonyl in a liquid in the presence of said supporter particles and by removing liquid components, said catalyst in which said metal fine particles are supported on said supporter particles is formed.

22. The method for producing the fuel cell according to claim 19, wherein, in the process of the formation of said catalyst, after forming said metal fine particles by reducing said platinum salt with said metal carbonyl, by screening sizes of the formed metal fine particles, by dispersing said metal fine particles whose sizes have been screened and said supporter particles in a liquid, and by removing liquid components, said catalyst in which said metal fine particles whose sizes have been screened are supported on said supporter particles is formed.

23. The method for producing the fuel cell according to claim 19, wherein, in the process of the formation of said catalyst, after forming said metal fine particles by reducing said platinum salt with said metal carbonyl, by selectively removing said metal contained in said metal fine particles, by dispersing said metal fine particles from which said metal has been selectively removed and said supporter particles in a liquid, and by removing liquid components, said catalyst in which said metal fine particles from which said metal has been selectively removed are supported on said supporter particles is formed.

24. The method for producing the fuel cell according to claim 23, wherein, when said catalyst in which said metal fine particles from which said metal has been selectively removed are supported on said supporter particles is formed by selectively removing said metal contained in said metal fine particles, by dispersing said metal fine particles from which said metal has been selectively removed and said supporter particle in a liquid, and by removing liquid components, after selectively removing said metal contained in said metal fine particles, by screening sizes of said metal fine particles from which said metal has been selectively removed, by dispersing said metal fine particles whose sizes have been screened and said supporter particles in a liquid, and by removing liquid components, said catalyst in which said metal fine particles whose sizes have been screened are supported on said supporter particles is formed.

25. The method for producing the fuel cell according to claim 19, wherein said platinum salt is platinum acetylacetonate.

* * * * *